Sept. 8, 1964            E. N. FRANK            3,147,748
COMBINED BARBECUE GRILL AND HAND TRUCK
Filed April 22, 1963
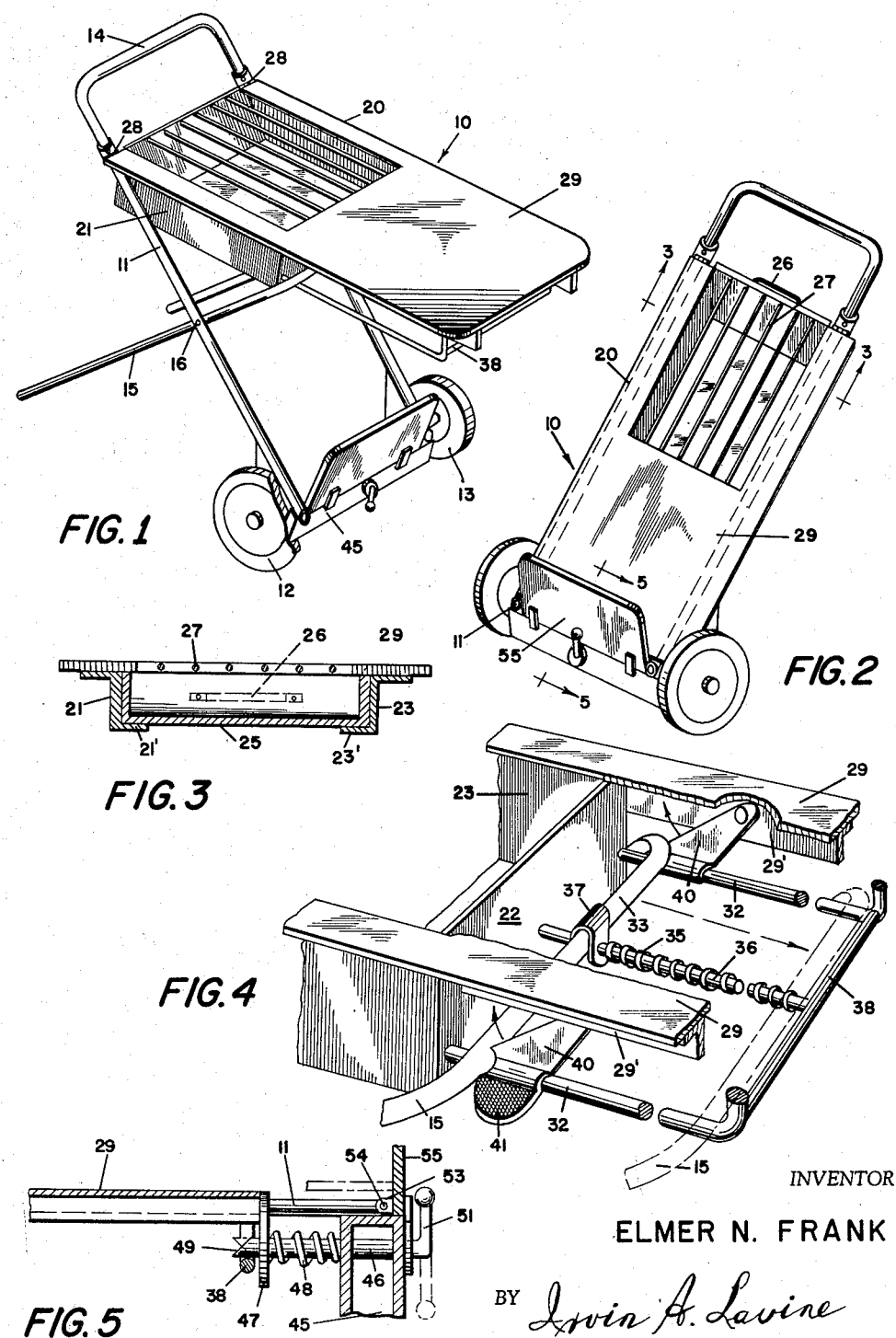
INVENTOR
ELMER N. FRANK
BY *Irvin A. Lavine*
ATTORNEY

United States Patent Office 3,147,748
Patented Sept. 8, 1964

3,147,748
COMBINED BARBECUE GRILL AND
HAND TRUCK
Elmer N. Frank, 2437 S. Howell Ave., Milwaukee, Wis.
Filed Apr. 22, 1963, Ser. No. 274,674
10 Claims. (Cl. 126—9)

The presnt invention relates to a combined barbecue grill and hand truck, and more particularly to one which may be readily erected from collapsed position with the aid of a concealed expander.

Barbecue grills have attained wide popularity in recent years, particularly those which are either mobile, or collapsible, or both. Many satisfactory configurations have been suggested, and numerous types have been widely manufactured and sold, thus satisfying a need for a device which permits cooking out of doors, which is relatively substantial and which may be moved about; in addition, these devices often had the added advantages that they could be collapsed to permit storage in a minimum space.

Another device of great utility is the hand truck or hand cart, which can be used as a small, light weight load transporter by the homeowner. These devices are less widely sold, perhaps because their utility and benefit have not become as widely known and accepted, and thus have not overcome a tendency by homeowners to avoid the acquisition of items deemed unnecessary.

In order to provide a device of greater utility, it has been proposed to combine in a single structure a device to function as either a hand truck or a barbecue grill. These devices, such as that shown in Elmer N. Frank Patent No. 3,008,463, enable the obtaining of two highly useful accessories in a single structure. The combined devices heretofore known, while highly advantageous, were not as readily collapsed as desirable, nor were they as easily erected as desirable. Further, the fire pot could not be readily removed, for cleaning, and replaced.

An object of the present invention is to provide a combined barbecue grill and hand truck which is readily collapsed for use as a hand truck and readily raised for use as a barbecue grill.

Another object of the present invention is the provision of a combined barbecue grill and hand truck having a concealed expander for raising the device for use as a grill.

Yet another object of the present invention is to provide a combined barbecue grill and hand truck in which a readily operated latch permits an expander to raise the device for use as a grill.

A further object of the present invention is the provision of a combined barbecue grill and hand truck which is of strong construction and is secure against unintentional collapse.

A still further object of the present invention is to provide a combined barbecue grill and hand truck which is not only readily collapsible but which has a firebox that may be easily removed for cleaning.

Other objects and the nature and advantages of the instant invention will be apparent from the following description taken in conjunction with the accompanying drawings, wherein:

FIG. 1 is a perspective view of a combined barbecue grill and hand truck in accordance with the present invention, shown in the erected position thereof.

FIG. 2 is a perspective view of the device shown in FIG. 1, collapsed and ready for use as a hand truck.

FIG. 3 is a cross sectional view taken on the line 3—3 of FIG. 2.

FIG. 4 is a detail view of a portion of the device as shown in FIG. 1, with parts broken away for clarity.

FIG. 5 is a cross sectional view taken on the line 5—5 of FIG. 2.

Referring now to the drawings, wherein like or corresponding reference numerals are used to designate corresponding parts throughout the several views, there is shown in FIG. 1 a combined barbecue grill and hand truck generally designated 10; for brevity hereinafter, it will be referred to as the "device." The device 10 comprises a first U-shaped leg member 11 having wheels 12 and 13 journaled at the lower end thereof and having a bight 14 at the upper end forming a handle. A second U-shaped leg member 15 is provided, prefererably interiorly of the leg member 11. Leg member 15 crosses leg member 11 in the position of the device as shown in FIG. 1, and a suitable bolt 16 (of which there are two) pivotally secures the two leg members together intermediate their ends.

A platform 20 has adjacent one end thereof three depending walls 21, 22 and 23 (see FIG. 4) having at their bottoms inturned flanges 21' and 23', as is best seen in FIG. 3. The depending walls and flanges provide a drawer-support arrangement having an opening which faces away from the wheels 12 and 13. A firebox 25 having a handle 26 is slidably carried by the dependent walls 21 and 23 and the flanges 21' and 23', and is in the nature of a drawer. As will be understood, the firebox 25 may be readily withdraw for emptying, and then returned to its position as shown. A grill comprising bars 27 overlies the firebox 25.

The platform 20 is pivotally secured by hinge elements 28 to the leg member 11 adjacent the bight 14, and has a table surface generally designated 29 extending outwardly from the grill 27 and away from the pivots 28.

Referring now to FIG. 4, there is shown a pair of L-shaped rods 32, which extend forwardly from the wall 22 and thence upwardly to flanges 29' which extend beneath the table surface 29. These rods 32, lying beneath and parallel to the table surface 29 form guide means for the bight 33 of the second leg member 15, which passes between the table surface 29 and the rods 32.

A resilient element, preferably in the form of an expansion spring 35, surrounds a guide bar 36. A traveller 37 rides on the guide bar 36, and is journalled on bight 33. One end of guide bar 36 is connected to a transverse rod 38, and the other end is joined to the wall 22. As will be understood, the spring or resilient expanding device 35 urges the bight 33 towards the bight 14 of the first leg member 11.

A pair of releasable latches 40 having outwardly extending operators 41 are pivoted to the flanges 29'. These latches 40 are engaged by the bight 33 when the device 10 is in the position shown in FIGS. 1 and 4, and so prevents the collapse of the device 10 which necessarily entails a movement of bight 33 away from bight 14. By simply raising the latches 40 through the operators 41, bight 33 may be readily moved to the right as shown in FIG. 4. On the other hand, when bight 33 is in the dotted line position as shown in FIG. 4, its movement towards the left will not be hindered by the latches 40, as they will pivot upwardly to permit the passage of bight 33 to the left.

Referring now to FIGS. 1 and 5, a spreader member 45 is shown; this spreader member 45 extends between the free ends of leg member 11 and is connected therewith. A bolt 46 extends transversely of spreader member 45, and is journaled therein for both rotational and longitudinal movement. A washer 47 is secured near one end of the bolt, and a spring 48 is placed between the washer 47 and the spreader member 45 to urge the bolt 46 to the left in a resilient manner. Bolt 46 to the left of washer 47 has a beveled end 49, and at its opposite end has a handle 51. When the bolt 46 is in the full line position shown in FIG. 5, the transverse bar 38 may engage the beveled end 49 when the device 10 is collapsed, and the bolt 46 will move to the right, against the urging of spring 48, to permit the passage of transverse bar 38, after which it will move to the left, to the position shown in FIG. 5. In order to release the transverse bar 38, the handle 51 is rotated to the dotted line position, thereby permitting transverse bar 38 to move upwardly, camming back the bolt 46 to the right, this being permitted by the beveled end 49.

Between the free ends of leg member 11 there extends a support 55 having a pair of ears extending from it. A single ear 53 may be seen in FIG. 5. The ear 53 is connected to the free ends of leg member 11, as by bolt 54. Support 55 may thereby be pivoted to the dotted line position shown in FIG. 5 in which it will overtie platform 29.

As shown in FIG. 1, the combined barbecue grill and hand truck 10 is in position to be used as a barbecue grill. To use the device 10 as a hand truck, it is only necessary to raise the latches 40 and to push downwardly on the platform 20, thereby causing the bight 33 to move to the right against the resilient expanding device 35. The parts of the device 10 are so proportioned that the bight 33 reaches the dotted line position shown in FIG. 4 when the leg members 11 and 15 are substantially coplanar. When the leg members 11 and 15 are in this position, the platform 20 is parallel to and slightly above them, and the device 10 is held in this position by engagement of bolt 46 with transverse bar 31 in the manner hereinabove described.

The device 10 is then in the configuration shown in FIG. 2, with the support 55 in the upstanding position shown so that it may retain articles resting against the table surface 29 of platform 20, or against the upper part of platform 20 including the grill bars 27. In this collapsed position, the device 10 has all the advantages of a strong and sturdy hand truck. For storage purposes, the support 55 may be rotated to the dotted line position shown in FIG. 5, so that the device 10 occupies a minimum amount of space.

To erect the device 10, the support 55 is rotated to the full line position shown in FIG. 5 and the handle 51 is rotated. This allows the relatively strong spring (or other expanding device) 35 to move the bight 33 to the left as shown in FIG. 4, since the force of the expanding device 35 will overcome the lighter force of spring 48 and cam bolt 46 to a release position. The latches 40 will then operate as hereinabove described.

There has been provided a very sturdy combined barbecue grill and hand truck which may be readily collapsed and readily erected. The device thus provided has a concealed resilient expander for raising the device, and also has a latch for either holding the device in collapsed position or for permitting the expander to raise the device.

There has also been provided a combined barbecue grill and hand truck which is secure against unintentional collapse, but which may be readily collapsed. The combined barbecue grill and hand truck of the present invention has a construction permitting ready removal of the firebox for cleaning purposes.

It will be obvious to those skilled in the art that various changes may be made without departing from the spirit of the invention and therefore the invention is not limited to what is shown in the drawings and described in the specification but only as indicated in the appended claims.

What is claimed is:

1. A combined barbecue grill and hand truck comprising a first U-shaped leg member having wheels at the lower end thereof and a bight forming a handle, a second U-shaped leg member crossing said first, means pivotally securing said leg members together intermediate their ends, a platform having adjacent one end thereof drawer-support means opening away from said wheels, a drawer-like firebox releasably carried by said drawer-support means, a grill overlying said firebox, means pivotally securing said platform at said one end to said first leg member adjacent the bight thereof, said platform comprising a table surface extending outwardly from said grill and having a transverse bar beneath the free end thereof, guide means beneath said table surface extending from said drawer-support means, the bight of said second leg member passing between said table surface and said guide means, resilient means operatively engaging and urging the bight of said second leg member towards the bight of said first leg member, releasable latch means engaged by said second bight for preventing movement thereof away from said first bight, a spreader member extending between the free ends of said first leg member and having a bolt transversely thereof journaled therein, said bolt having a beveled end adapted to be engaged by said transverse bar when said grill is collapsed, said bolt being spring-urged toward said beveled end and having a handle at the opposite end thereof, and a support pivoted to said spreader member for movement from a position transverse of the plane of said first leg member to a position overlying said first leg member.

2. The device of claim 1, said guide means comprising a pair of L-shaped rods each having an end secured beneath said table surface.

3. The device of claim 1, said latch means comprising a pair of latches pivotally connected to the underside of said platform.

4. A combined barbecue grill and hand truck comprising a first U-shaped leg member having wheels at the lower end thereof and a bight forming a handle, a second U-shaped leg member crossing said first, means pivotally securing said leg members together intermediate their ends, a platform having adjacent one end thereof a firebox, a grill overlying said firebox, means pivotally securing said platform at said one end to said first leg member adjacent the bight thereof, said platform comprising a table surface extending outwardly from said grill and having a transverse bar beneath the free end thereof, guide means beneath said table surface, the bight of said second leg member passing between said table surface and said guide means, resilient means operatively engaging and urging the bight of said second leg member towards the bight of said first leg member, releasable latch means engaged by said second bight for preventing movement thereof away from said first bight, a spreader member extending between the free ends of said first leg member and having a bolt transversely thereof journaled therein, said bolt having a beveled end adapted to be engaged by said transverse bar when said grill is collapsed, said bolt being spring-urged toward said beveled end and having a handle at the opposite end thereof, and a support pivoted to said spreader member for movement from a position transverse of the plane of said first leg member to a position overlying said first leg member.

5. A combined barbecue grill and hand truck comprising a first U-shaped leg member having wheels at the lower end thereof and a bight forming a handle, a second U-shaped leg member crossing said first, means pivotally securing said leg members together intermediate their ends, a platform having adjacent one end thereof a firebox, a grill overlying said firebox, means pivotally securing said platform at said one end to said first leg member adjacent the bight thereof, said platform comprising a table surface extending outwardly from said grill and having a transverse bar beneath the free end thereof, guide means beneath said table surface, the bight of said second leg member passing between said table surface and said guide means, resilient means operatively engaging and urging the bight of said second leg member towards the bight of said first leg member, releasable latch means engaged by said second bight for preventing movement thereof away from said first bight, a movable bolt between the free ends of said first leg member and generally parallel thereto, said bolt having a beveled end adapted to be engaged by said transverse bar when said grill is collapsed, said bolt being spring-urged toward said beveled end and having a handle at the opposite end thereof, and a support pivotally carried by said first leg member for a movement from a position transverse of the plane of said first leg member to a position overlying said first leg member.

6. A combined barbecue grill and hand truck comprising a first U-shaped leg member having wheels at the lower end thereof and a bight forming a handle, a second U-shaped leg member crossing said first, means pivotally securing said leg members together intermediate their ends, a platform having adjacent one end thereof a firebox, a grill overlying said firebox, means pivotally securing said platform at said one end to said first leg member adjacent the bight thereof, said platform comprising a table surface extending outwarldy from said grill and having a transverse bar beneath the free end thereof, guide means beneath said table surface, the bight of said second leg member passing between said table surface and said guide means, resilient means operatively engaging and urging the bight of said second leg member towards the bight of said first leg member, releasable latch means engaged by said second bight for preventing movement thereof away from said first bight, a movable bolt between the free ends of said first leg member, said bolt having an end adapted to overlie said transverse bar when said grill is collapsed, and a support pivotally carried by said first leg member for movement from a position transverse of the plane of said first leg member to a position overlying said first leg member.

7. A combined barbecue grill and hand truck comprising a first U-shaped leg member having wheels at the lower end thereof and a bight forming a handle, a second U-shaped leg member crossing said first, means pivotally securing said leg members together intermediate their ends, a platform having adjacent one end thereof a firebox, a grill overlying said firebox, means pivotally securing said platform at said one end to said first leg member adjacent the bight thereof, said platform comprising a table surface extending outwardly from said grill and having a transveres bar therebeneath, means beneath said table surface for guiding the bight of said second leg member in movement parallel to said table surface, resilient means operatively engaging and urging the bight of said second leg member towards the bight of said first leg member, releasable latch means engaged by said second bight for preventing movement thereof away from said first bight, a movable bolt between the free ends of said first leg member, said bolt having an end adapted to overlie said transverse bar when said grill is collapsed, and a support pivotally carried by said first leg member for movement from a position transverse of the plane of said first leg member to a position overlying said first leg member.

8. A combined barbecue grill and hand truck comprising a first U-shaped leg member having wheels at the lower end thereof and a bight forming a handle, a second U-shaped leg member crossing said first, means pivotally securing said leg members together intermediate their ends, a platform having adjacent one end thereof a firebox, a grill overlying said firebox, means pivotally securing said platform at one end to said first leg member adjacent the bight thereof, said platform comprising a table surface extending from said grill, a transverse bar beneath said platform remote from said first bight, means beneath said table surface for guiding the bight of said second leg member in movement parallel to said table surface, resilient means operatively engaging and urging the bight of said second leg member towards the bight of said first leg member, releasable latch means engaged by said second leg member for preventing movement of said second bight away from said first bight, a movable bolt between the free ends of said first leg member, said bolt having an end adapted to overlie said transverse bar when said grill is collapsed, and a support pivotally carried by said first leg member for movement from a position transverse of the plate of said first leg member to a position overlying said first leg member.

9. In a combined barbecue grill and hand truck, a first U-shaped leg member having wheels at the lower end thereof and a bight forming a handle, a second U-shaped leg member crossing said first, means pivotally securing said leg members together intermediate their ends, a platform, means pivotally securing said platform at one end to said first leg member adjacent the bight thereof, said platform having a catch remote from said first bight, means beneath said platform surface for guiding the bight of said second leg member in movement parallel thereto, resilient means operatively engaging and urging the bight of said second leg member towards the bight of said first leg member, releasable latch means engaged by said second leg member for preventing movement of said second bight away from said first bight, a movable bolt carried by said first leg member, said bolt having an end adapted to engage said catch when the device is collapsed, and a support pivotally carried by said first leg member for movement from a position transverse of the plane of said first leg member to a position overlying said first leg member.

10. The device of claim 9, a firebox slidably carried by said platform, and a grill in said platform over said firebox.

References Cited in the file of this patent
UNITED STATES PATENTS
3,008,463 Frank _____ Nov. 14, 1961